(12) United States Patent
McCown

(10) Patent No.: US 7,426,541 B2
(45) Date of Patent: Sep. 16, 2008

(54) ELECTRONIC MAIL METADATA GENERATION AND MANAGEMENT

(75) Inventor: Steven H. McCown, Rigby, ID (US)

(73) Assignee: Storage Technology Corporation, Louisville, CO (US)

( * ) Notice: Subject to any disclaimer, the term of this patent is extended or adjusted under 35 U.S.C. 154(b) by 719 days.

(21) Appl. No.: 10/935,251

(22) Filed: Sep. 7, 2004

(65) Prior Publication Data

US 2006/0053200 A1    Mar. 9, 2006

(51) Int. Cl.
*G06F 15/16*    (2006.01)
(52) U.S. Cl. .................... 709/206; 709/207
(58) Field of Classification Search ............ 709/206, 709/207
See application file for complete search history.

(56) References Cited

U.S. PATENT DOCUMENTS

| | | | |
|---|---|---|---|
| 6,505,236 B1 * | 1/2003 | Pollack | 709/206 |
| 7,113,948 B2 * | 9/2006 | Jhingan et al. | 709/203 |
| 7,219,131 B2 * | 5/2007 | Banister et al. | 709/206 |
| 2005/0273858 A1 * | 12/2005 | Zadok et al. | 709/230 |
| 2006/0031309 A1 * | 2/2006 | Luoffo et al. | 709/206 |

* cited by examiner

*Primary Examiner*—Phuoc H Nguyen
(74) *Attorney, Agent, or Firm*—Brooks Kushman P.C.

(57) ABSTRACT

Electronic mail is archived and retrieved based on metadata generated by the client sending the electronic mail. The metadata is generated based on variable metadata generation policies distributed to each client. The metadata generation policies are executed in each client in conjunction with each electronic mail sent from the client. The electronic mail is received in a mail server on route to at least one addressee of the electronic mail. The received electronic mail is processed based on the metadata attached to the received electronic mail.

18 Claims, 3 Drawing Sheets

ELECTRONIC MAIL METADATA GENERATION AND MANAGEMENT

BACKGROUND OF THE INVENTION

1. Field of the Invention

The present invention relates to processing electronic mail such as for archiving and retrieving.

2. Background Art

Electronic mail (e-mail) has become a mainstay of corporate and personal communications. Recent analyst figures show e-mail usage to be between 20-30 billion messages per day and growing at an annual rate of 29%. Individual accounts are estimated to receive an average of 7 MB daily. For moderate sized companies, an annual addition of roughly 20 TB of e-mail storage space is required. Electronic mail is no longer limited to text, but typically includes a variety of attachments including word processor files, spreadsheets, slide shows, pictures, video clips, audio clips, embedded graphics, design files, and the like. In addition to traditional e-mail, instant messaging is expected to have 180 million users sending 2 trillion messages per year in the near future.

Archiving and retrieving archived electronic mail has become a major concern for many corporations. Information technology departments may spend 25%-35% of their efforts archiving and recovering e-mail. In addition, recent government regulations require e-mail to be archived for at least six years in certain situations.

Due to the recent emphasis on e-mail and a probable need for later discovery, more enhanced searching techniques are being developed. Electronic mail indexing and metadata generation is typically performed on a mail server and/or an archive server. Current indexing schemes generally perform keyword indexing and concentrate on common information such as the sender, receiver, time sent, time received, time read, and the like. There indexing methods are insufficient to handle the increasing workload. New and enhanced searching techniques are being developed that will link similar concepts described with different vernacular. Even more futuristic systems are being researched that will better respond to user criteria, span concepts and link related ideas not possible with simple keyword searching.

New types of content indexing are processor intensive and will likely impose a greater burden on mail servers and/or archive servers. The type and amount of processing that must be done in order to yield desired results in a timely fashion combined with the abilities of servers and server software will introduce a significant bottleneck in the e-mail system. What is needed is an alternative to the traditional e-mail server configuration.

SUMMARY OF THE INVENTION

The present invention distributes archival metadata generation to e-mail clients.

A method of managing electronic mail received from a plurality of clients is provided. Variable metadata generation policies are distributed to each client. The metadata generation policies are executed in each client in conjunction with each electronic mail sent from the client. Executing the policies generates metadata associated with the electronic mail to be sent. The generated metadata is attached to the sent electronic mail. The sent electronic mail is received in a mail server on route to at least one addressee of the electronic mail. The received electronic mail is archived based on the metadata attached to the received electronic mail.

In various embodiments of the present invention, the electronic mail may be archived in the mail server or an associated archive server. The variable metadata generation policies may be generated by and/or sent by either or both of the mail server or the archive server.

In another embodiment of the present invention, the metadata accompanying the electronic mail includes a version indicator specifying which policies were used to generate the metadata. A different version of the variable metadata generation policies may be distributed to the client sending the electronic mail based on the version indication.

In yet another embodiment of the present invention, a request to access at least one archived electronic mail is received. At least one archived electronic mail is searched for using metadata which accompanied the request.

A system for managing electronic mail is also provided. The system includes a plurality of clients. Each client generates electronic mail including metadata based on variable metadata generating policies. At least one mail server receives electronic mail generated by the clients. The mail server processes the received electronic mail for archiving based on the metadata included with the received mail.

A method of managing electronic mail utilizing scripts is also provided. A script is developed for generating metadata describing the electronic mail. The script is delivered from a server to a plurality of clients. The script is executed within each client in conjunction with each electronic mail message sent by the client so as to generate metadata describing the electronic mail message. The metadata is then sent to the server.

These and other objects, features and advantages of the present invention will be readily apparent upon consideration of the following detailed description in conjunction with the accompanying drawings.

DETAILED DESCRIPTION OF THE PREFERRED EMBODIMENT(S)

Figure 1:
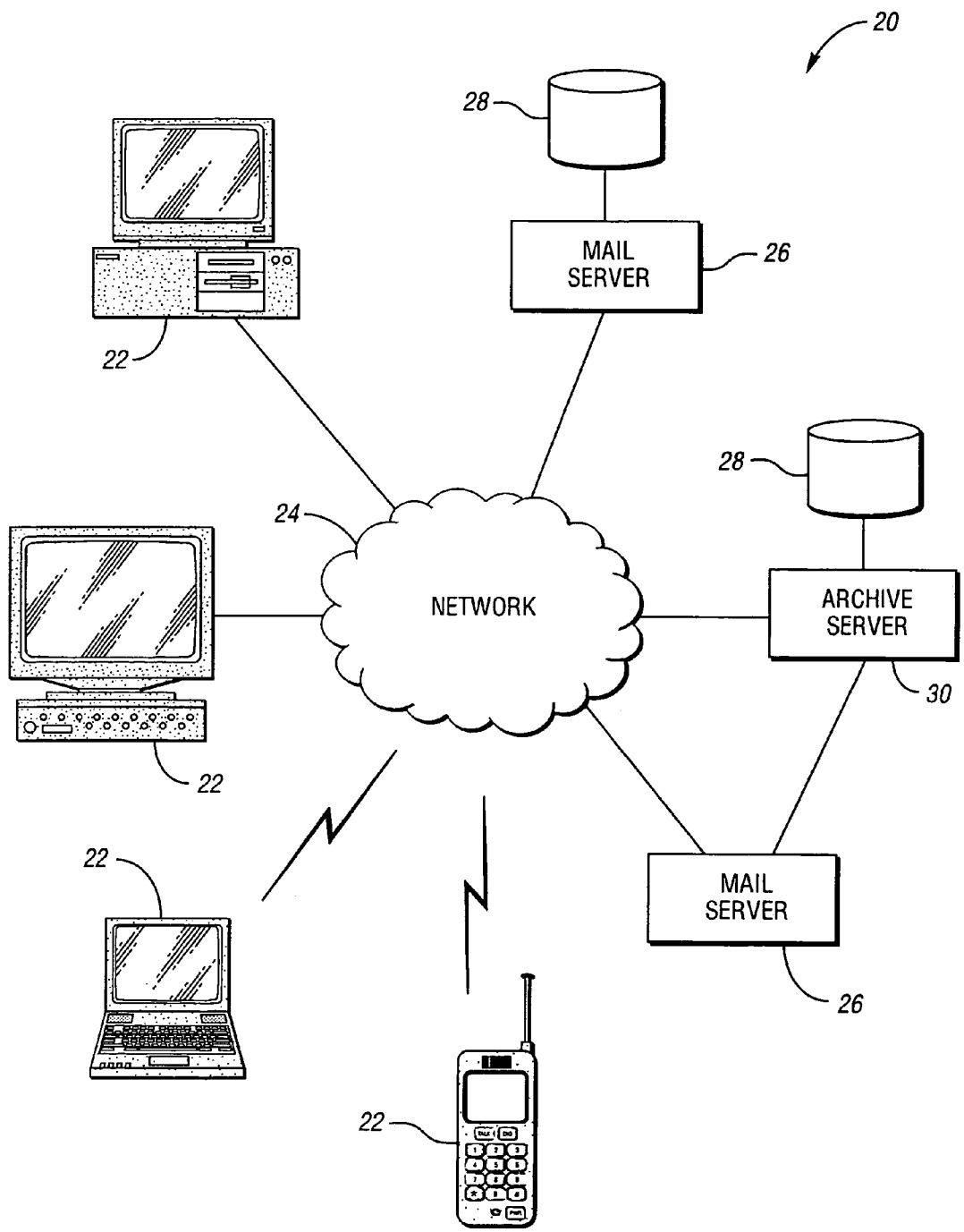
FIG. 1 is a block diagram illustrating an electronic mail system according to an embodiment of the present invention.

Referring to FIG. 1, a block diagram illustrating an electronic mail system according to an embodiment of the present invention is shown. Electronic mail system, shown generally by 20, includes a plurality of clients 22 each of which sends and/or receives electronic mail (e-mail). Clients 22 are typically computer systems such as personal computers, workstations and the like. However, clients 22 can also include wireless telephones, personal digital assistants, and the like. Clients 22 are interconnected by network 24. Network 24 may be one or more of the Internet, an intranet, a local area network, a metropolitan area network, a wide area network, a storage area network, and the like.

Each client 22 attaches metadata to each e-mail sent. This metadata is generated based on variable metadata generating policies received by client 22 over network 24. The policies are variable in that they can be changed while client 22 is in operation. In some systems 20, each client 22 is sent the same set of policies. In other systems 20, different policies may be sent to different clients or sets of clients based on a variety of parameters such as type of client 22, type of service subscribed to by client 22, organizational group to which client 22 is associated, location of client 22, capabilities of client 22, and the like.

Electronic mail system 20 also includes at least on mail server 26. Mail server 26 receives electronic mail from sending client 22 and forwards mail to receiving client 22. Mail server 26 may also include storage 28 for archiving e-mail. Storage 28 may include one or more disk and/or tape drives capable of holding e-mail. Electronic mails system 20 may also include one or more archive server 30 with storage 28 for archiving e-mail. If present, archive server 30 may be directly connected to mail server 26 or may be accessed through network 24.

Either or both of mail server 26 and archive server 30 processes metadata received with e-mail to assist in archiving and retrieving e-mail. For example, the metadata may be indexed and stored together with a pointer to the archived location of the e-mail. Subsequent queries requesting archived e-mail include metadata. The indexed metadata is searched for received metadata values. Electronic mail matching the received metadata search criteria is retrieved and returned in response to the query.

Metadata that can be processed by the present invention includes a wide variety of information. Simple metadata includes date, time, size, sender, receiver, and the like. An index of keywords may also be included. Metadata generation functions may be used to determine a main idea or theme. Metadata filtering may be used to determine if certain words or phrases are used. For example, shortened expressions such as "r u redy?" are often used in text messaging.

Advanced metadata generation may be performed with the assistance of server 26, 30. For example, a system administrator may write metadata generation script. This script is then pushed from server 26, 30 out to clients 22. Client 22 then executes the script on newly generated e-mail. The script may also be used within server 26, 30 on existing e-mail. Thus, new metadata gathering techniques can be generated as needed within an organization.

Figure 2:
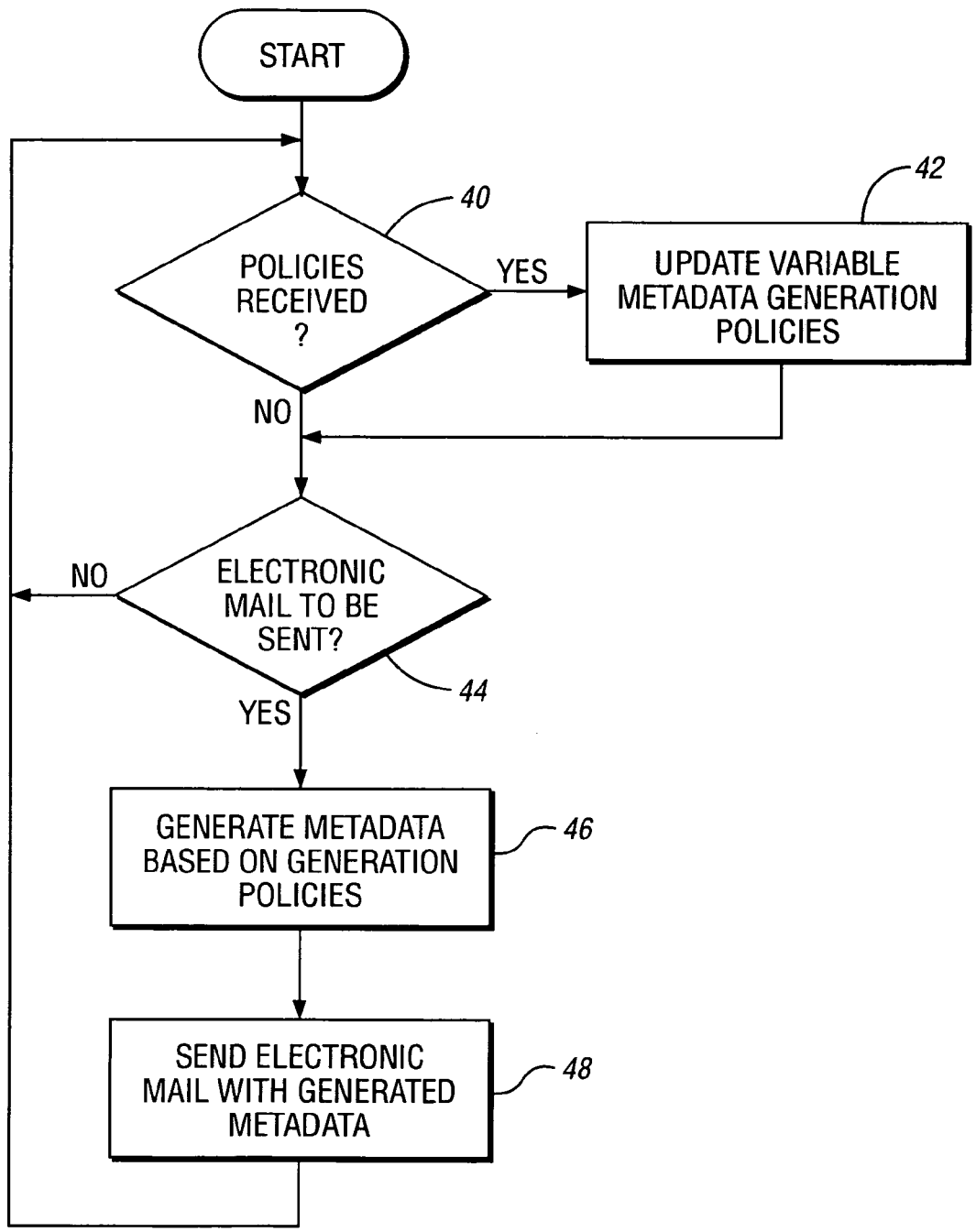
FIG. 2 is a flow diagram illustrating client operation according to an embodiment of the present invention.
Figure 3:
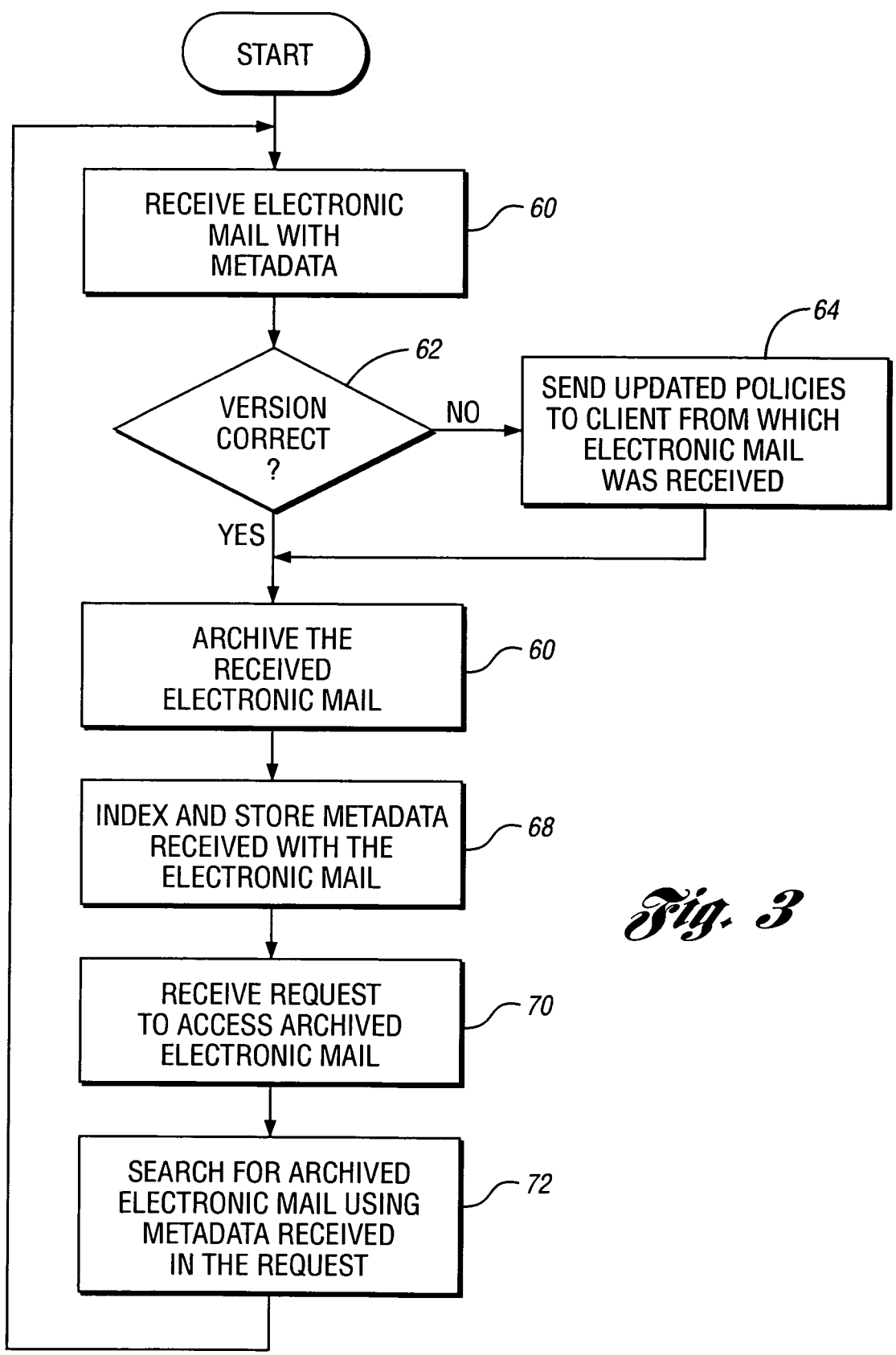
FIG. 3 is a flow diagram illustrating server operation according to an embodiment of the present invention.

Referring now to FIGS. 2 and 3, flow charts illustrating operation of the present invention are shown. As will be appreciated by one of ordinary skill in the art, the operations illustrated are not necessarily sequential operations. Similarly, operations may be performed by software, hardware, or a combination of both. The present invention transcends any particular implementation and aspects are shown in sequential flow chart form for ease of illustration.

Referring now to FIG. 2, a flow diagram illustrating client operation according to an embodiment of the present invention is shown. A check is made to determine if variable metadata generation policies are received by the client, as in block 40. If so, metadata generation policies are updated, as in block 42.

A check is made to determine if e-mail is to be sent, as in block 44. If so, metadata is generated based on the current metadata generation policies, as in block 46. The generated metadata is attached to and sent with the e-mail, as in block 48. For example, the generated metadata can be included in a mime file sent together with the e-mail message.

Referring now to FIG. 3, a flow diagram illustrating server operation according to an embodiment of the present invention is shown. Either the mail server or the archive server, depending upon the implementation chosen, receives an e-mail with metadata, as in block 60. In a preferred embodiment, a check is made to determine if the version is correct, as in block 62. A version identifier is included with the metadata indicating which policies were used to generate the metadata. If the version is not correct, such as if the policies were superceded, the server sends updated policies to the client which generated the e-mail. This provides a simple mechanism for keeping clients up-to-date with metadata policy changes.

The received e-mail is archived, as in block 66. The metadata accompanying the received e-mail is processed for use in retrieving the archived e-mail, as in block 68. For example, the metadata may be indexed and stored together with an address or pointer to the archived e-mail message.

A request to access the archived e-mail is received, as in block 70. The request may be accompanied by metadata specifying the e-mail to be retrieved. A search for the archived e-mail using the received metadata is conducted, as in block 72.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of managing electronic mail received from a plurality of clients, the method comprising:

generating variable metadata generation policies via a mail server;

distributing the variable metadata generation policies to each client;

in each client, executing the metadata generation policies in conjunction with each electronic mail sent from the client, the executed metadata generation policies generating metadata associated with the sent electronic mail, and attaching the generated metadata to the sent electronic mail;

receiving the sent electronic mail in the mail server on route to at least one addressee of the electronic mail;

performing a check on the metadata transmitted with the electronic mail to determine if the metadata generation policies are up to date for a particular client; and archiving the received electronic mail based on the metadata attached to the received electronic mail;

whereby metadata generation functions are distributed to the clients for execution by the clients rather than by the mail server.

2. The method of managing electronic mail as in claim 1 wherein the variable metadata generation policies are sent from the mail server.

3. The method of managing electronic mail as in claim 1 wherein the received electronic mail is archived by an archive server separate from the mail server.

4. The method of managing electronic mail as in claim 3 wherein the variable metadata generation policies are generated in at least one of the mail server and the archive server.

5. The method of managing electronic mail as in claim 1 wherein the metadata comprises a version indication of which variable metadata generation policies were used by a client sending the electronic mail.

6. The method of managing electronic mail as in claim 5 wherein a different version of the variable metadata generation policies is distributed to the client sending the electronic mail based on the version indication.

7. The method of managing electronic mail as in claim 1 further comprising:

receiving a request to access at least one archived electronic mail, the request specifying metadata; and searching for the at least one archived electronic mail using the metadata in the request.

8. The method of managing electronic mail as in claim 1 further comprising transmitting updated variable metadata generation policies to the particular client in response to determining that the metadata generation policies are outdated.

9. A system for managing electronic mail comprising:
a plurality of clients, each client generating electronic mail including metadata attached to the electronic mail and the metadata is generated by the client based on variable metadata generation policies, the variable metadata generating policies received by the client; and
at least one mail server in communication with the plurality of clients, each mail server generating the variable metadata generation policies, each mail server receiving electronic mail generated by the plurality of clients, each mail server checking the metadata in the electronic mail to determine if the metadata generating policies for a particular client are up to date, and each mail server processing the received electronic mail for archiving based on the metadata included with the received mail, wherein metadata generating functions are distributed to the clients for execution rather than by the at least one mail server.

10. The system for managing electronic mail of claim 9 wherein the received mail is archived by the mail server.

11. The system for managing electronic mail of claim 9 wherein the mail server generates the variable metadata generation policies.

12. The system for managing electronic mail of claim 9 wherein the mail server processes a request to access archived electronic mail based on metadata accompanying the request.

13. The system for managing electronic mail of claim 9 further comprising an archive server in communication with the mail server, the archive server archiving electronic mail.

14. The system for managing electronic mail of claim 13 wherein the archive server generates the variable metadata generation policies.

15. The system for managing electronic mail of claim 13 wherein the archive server processes a request to access archived electronic mail based on metadata accompanying the request.

16. The system for managing electronic mail of claim 9 wherein the metadata included in electronic mail sent by each client comprises a version indicator indicating which variable metadata generation policies were used to generate the metadata.

17. The system for managing electronic mail of claim 16 wherein the metadata generation policies received by at least one client are based on the version indicator previously sent by the at least one client.

18. A method of managing electronic mail comprising:
developing script for generating metadata describing the electronic mail;
distributing the script from a server to a plurality of clients;
executing the script within each client in conjunction with each electronic mail message sent by the client so as to generate the metadata describing the electronic mail message;
sending the generated metadata to the server, wherein the metadata comprises a version indication of which script for generating metadata was used by the client sending the electronic mail; and
distributing a different version of a script for generating metadata to the client sending the electronic mail based on the version indication.

* * * * *